Jan. 16, 1940.                 H. A. KNOX                    2,186,979
                           VEHICLE TRACK CHAIN
                         Filed Sept. 20, 1937
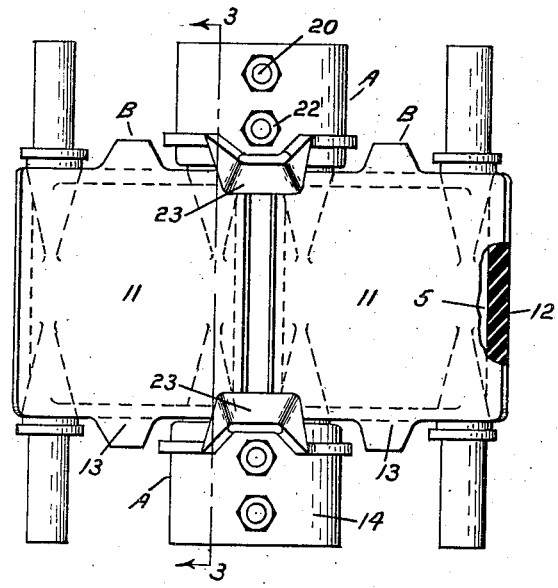
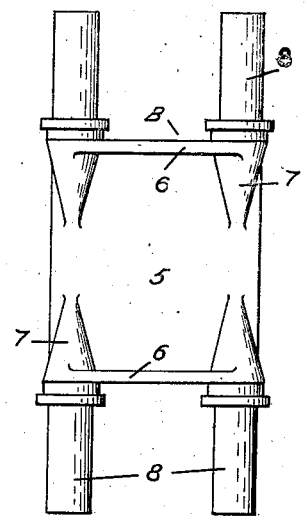
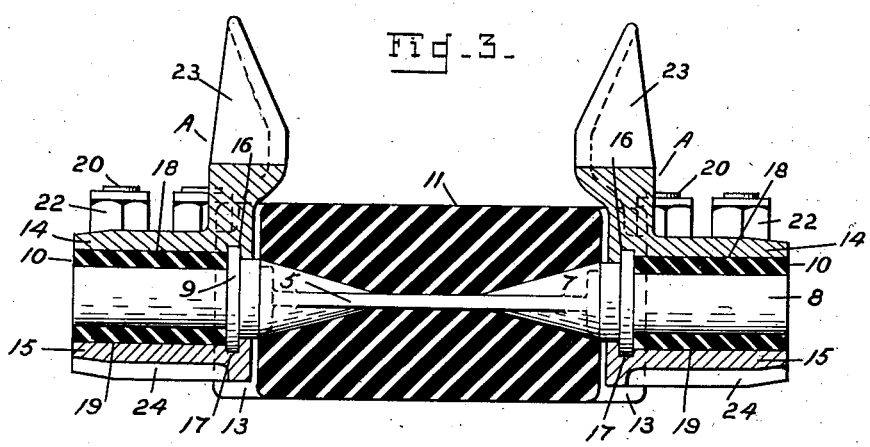
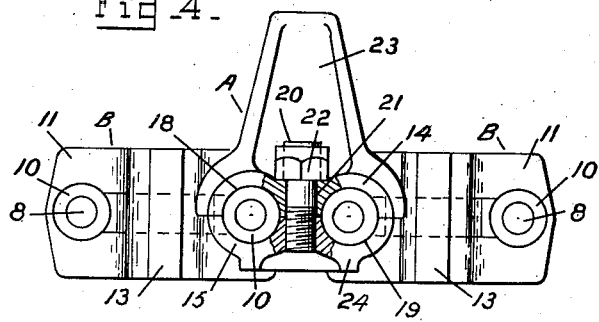
Inventor
Harry A. Knox
By W. N. Roach
Attorney Patented Jan. 16, 1940

2,186,979

UNITED STATES PATENT OFFICE 2,186,979

VEHICLE TRACK CHAIN

Harry A. Knox, Washington, D. C.

Application September 20, 1937, Serial No. 164,745

4 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a vehicle track chain.

In vehicle track chains in which the joint between the sections includes a rubber bushing it is customary to fix the bushing to the elements of the joint by vulcanization or by inserting the bushing under compression. These methods of fixing the bushing in place involve inconvenience and difficulties of assembling.

The purpose of this invention is to provide an arrangement of the elements of the joint in which the link for connecting the shoes is formed in two parts so that it may be readily applied to the resilient bushing and then clamped to compress the bushing and hold it firmly in place.

To these and other ends, the invention consists in the construction, arrangement and combination of elements described hereinafter and pointed out in the claims forming a part of this specification.

A practical embodiment of the invention is illustrated in the acompanying drawing, wherein:

Fig. 1 is a plan view of a portion of the lower flight of a track constructed in accordance with the invention.

Fig. 2 is a plan view of the metal plate.

Fig. 3 is an enlarged sectional view on the line 3—3 of Fig. 1.

Fig. 4 is a view in side elevation of Fig. 1.

The track comprises a row of shoes A connected in spaced relation by links B.

The shoes are all identical and each consists of a metal plate 5 which may be of the open type shown in U. S. Patent 2,129,696 and having on its two sides flanges 6 which merge at the four corners with inwardly extending reinforced portions 7. A laterally projecting link pin 8 is formed integrally with the plate at each reinforced corner and its inner portion includes a collar 9 which is spaced from the side of the plate. A resilient bushing 10, of rubber or rubber-like material is mounted on each pin on the outer side of the collar.

Blocks 11—11 of rubber or rubber-like material vulcanized to opposite faces of the plate 5 are connected by end portions 12 and by side portions 13 so that the rubber encloses all of the plate except the sides in the vicinity of the link pins.

The links B are all identical and each one is in the form of a clamp consisting of an upper plate 14 and a lower plate 15 provided respectively on their adjacent faces with pairs of transversely disposed grooves 16—16 and 17—17 and with pairs of longitudinally disposed grooves 18—18 and 19—19. The plates are applied to adjacent link pins of adjacent shoes, the grooves 18 and 19 receiving the bushing 10, and the grooves 16 and 17 receiving the collars 9 of the link pins. A pair of stud bolts 20—20 fixed to the plate 15 along its center line extend through apertures 21—21 in the plate 14 and each receives a nut 22. The plates are clamped together to form a rigid link and to compress the bushing so that its outer surface will be firmly held in place against the grooved plates and its inner surface will be firmly held in place against the link pin. With this arrangement relative angular movement of the shoes is permitted by distortion of the rubber bushing. The links may be easily and quickly removed when it is desired to invert or replace a shoe.

Each link constitutes a driving lug and the upper plate 14 includes an upstanding guide lug 23 and guide flanges 24 on the portion adjacent the shoe.

I claim:

1. A vehicle track chain comprising a series of spaced shoes, each shoe including a plate having a laterally projecting link pin at each of the corners and integral therewith, each link pin having a collar spaced from the plate, a bushing of resilient rubber-like material on each link pin, links for connecting adjacent link pins of adjacent shoes, each link consisting of a pair of plates having grooves for engaging the bushings of adjacent link pins, and having grooves for receiving the collars of adjacent link pins, stud bolts carried by one of the plates and extending through the other plate, and a nut on each bolt for clamping the plates and compressing the bushings on the link pins.

2. A vehicle track chain comprising a series of spaced shoes, each shoe including a plate having a laterally projecting link pin at each of the corners and integral therewith, each link pin which may be of the open type shown in U. S. Patent 2,129,696 and having a collar spaced from the plate, a bushing of resilient rubber-like material on each link pin, links for connecting adjacent link pins of adjacent shoes, each link consisting of a pair of plates having grooves for engaging the bushings of adjacent link pins and having grooves for receiving the collars of adjacent link pins, and means for clamping the plates to compress the bushings on the link pins.

3. A vehicle track chain comprising a series of spaced shoes, each shoe including a rigid plate having a laterally projecting link pin at each of the corners and integral therewith, a cylindrical bushing of resilient rubber-like material on each link pin, links for connecting adjacent link pins of adjacent shoes, each link consisting of a pair of plates having grooves for engaging the bushings of adjacent link pins, and means for clamping the plates to compress the bushings on the link pins.

4. A vehicle track chain comprising a series of spaced shoes, each shoe including a laterally projecting link pin at each of the corners, each link pin having a collar spaced from the outer end of the link pin, a bushing of resilient rubber-like material on each link pin on the outer side of the collar, links for connecting adjacent link pins of adjacent shoes, each link consisting of a pair of plates having grooves for engaging the bushings of adjacent link pins and having grooves for receiving the collars of adjacent link pins, and means for clamping the plates to compress the bushings on the link pins.

HARRY A. KNOX.

CERTIFICATE OF CORRECTION.

Patent No. 2,186,979. January 16, 1940.

HARRY A. KNOX.

It is hereby certified that error appears in the printed specification of the above numbered patent requiring correction as follows: Page 1, second column, lines 44, 45, and 46, claim 2, strike out the words "which may be of the open type shown in U.S. Patent 2,129,696 and"; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.